(No Model.)
J. JACKSON.
DEVICE FOR EMBALMING.
No. 322,541. Patented July 21, 1885.
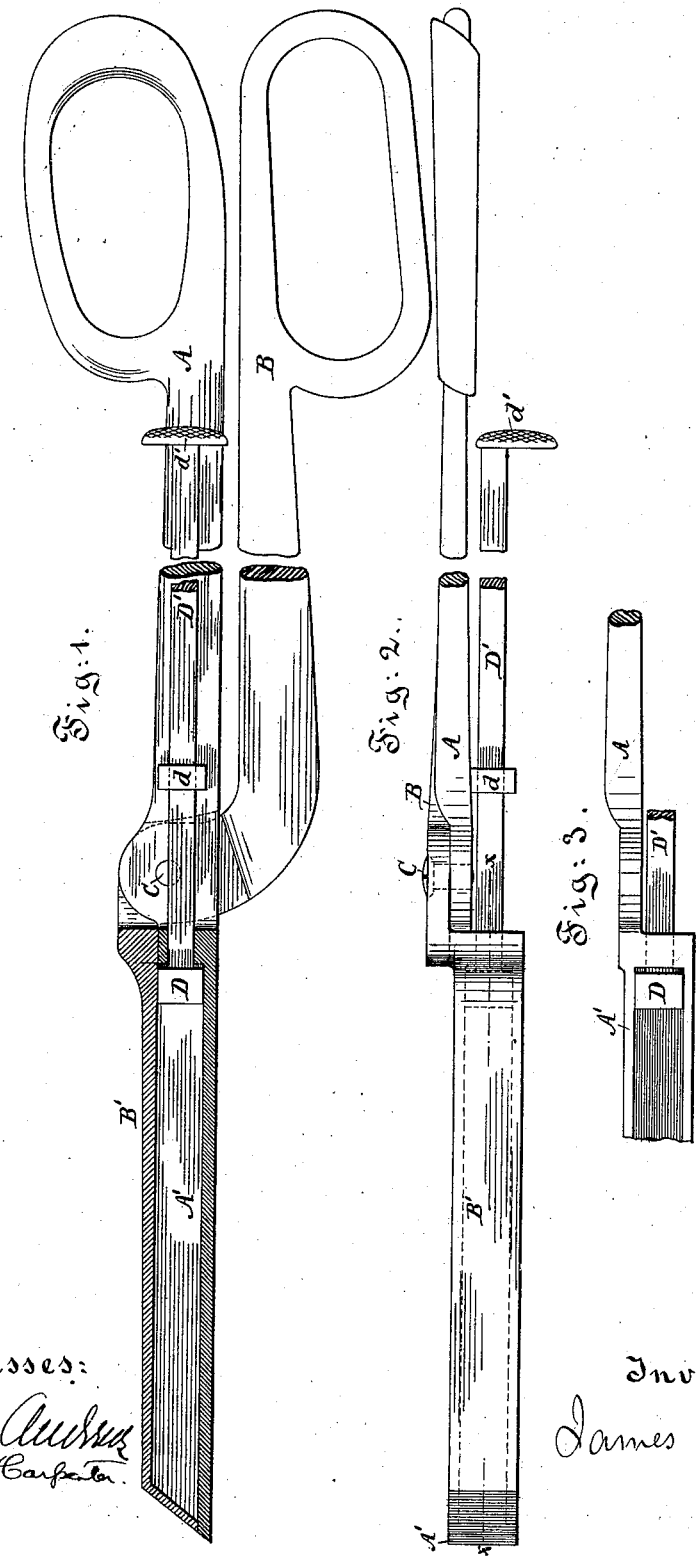
Witnesses:
Inventor:
James Jackson

UNITED STATES PATENT OFFICE.

JAMES JACKSON, OF NEW YORK, N. Y.

DEVICE FOR EMBALMING.

SPECIFICATION forming part of Letters Patent No. 322,541, dated July 21, 1885.

Application filed September 26, 1884. (No model.)

*To all whom it may concern:*

Be it known that I, JAMES JACKSON, a citizen of the United States, residing at the city of New York, in the county of New York and State of New York, have invented a new and useful Improvement in Salt-Injectors, which improvement is hereinafter fully set forth in this specification and accompanying drawings.

Heretofore meat has been salted by placing it in brine. As the brine works into the tissues of the meat from without inward, this process has necessarily taken a longer time than if means had also been provided for injecting salt into the meat as well, and thus causing the salt so injected to work through the tissues from within outward at the same time that the brine was working from without inward. It has been attempted to inject salt into meat by means of a scissors-shaped instrument with hollow blades, which blades were filled with salt and pushed into the meat, and then turned and twisted about in the torn tissues until the salt or a portion thereof could be left within the meat, when the blades were pulled out. This was a crude and bungling means of attempting to accomplish the purpose desired, for the reason that the operator lost time in turning and twisting the instrument, unnecessarily tore the tissues, spilled part of the salt in removing the instrument, and was often obliged to use his fingers to push part of the salt into the meat.

The object of my invention is to inject salt into meat or charge meat with salt without unnecessarily tearing its tissues, and in a much shorter time and with less effort or labor than would be required in the use of the instrument above referred to; and this object I accomplish by means of my invention, as hereinafter described.

The nature of my invention consists of a piston placed within a chamber or tunnel formed in one blade of a two-bladed instrument, whose blades are fastened together like a pair of shears, the other blade fitting upon and constituting a cover to the chamber or tunnel of the hollow blade, the blades having shanks or handles, and the piston being attached to a piston-rod, having at its exposed end a finger-button, and being connected by a suitable fastening or fastenings to one of the shanks or handles of said instrument, the shank or handle to which the piston-rod is so fastened being connected to or formed upon the blade to which it belongs, so as to extend backward therefrom substantially parallel thereto, but out of line with the axis thereof, in such manner that the piston may slide backward or forward within the chamber or tunnel of the hollow blade accordingly as pressure is exerted. I prefer to give the hollow blade forming the chamber or tunnel a chisel-edge, for the reason hereinafter stated. Either blade may form the chamber or tunnel, and either blade may form the cover, it being immaterial which construction is used, although I show but one construction in the drawings, the other construction being too simple to need a separate illustration.

The operator takes the above-described instrument in one hand, and, opening the blades and exposing the chamber or tunnel, thrusts the blades into salt, thus driving the piston backward and filling the chamber or tunnel with salt. He then shuts the cover upon the chamber or tunnel so filled with salt by closing the shanks or handles, and plunges the blades into the meat, and, pressing a finger of the other hand upon the finger-button, withdraws the blades from the meat. By this means he deposits the salt within the passage formed by plunging the blades into the meat, does not unnecessarily tear the tissues, and occupies only a short time to carry through the whole operation. If the hollow blade has a chisel-edge the operator can make a cleaner cut and use less force or effort than if the blade is blunt. It is not necessary that the walls of the chamber or tunnel should be four walls at right angles with each other, although I prefer that construction; but the chamber or tunnel may be cylindrical, or of any form or shape along which a piston may play.

In the accompanying drawings, Figure 1 is a side view in section on the line $x\ x$ of Fig. 2, and shows the instrument with the piston driven back and blades closed. Fig. 2 is a plan of Fig. 1. Fig. 3 is a plan of a portion of the instrument.

Similar letters refer to similar parts throughout the several views.

D represents the piston; A', the hollow blade, within which the piston slides; D', the piston-rod with its finger-button d', and fastened to the shank or handle A by the guide $d$. The shank or handle A is shown formed on or connected to the blade A' so as to extend backward therefrom substantially parallel thereto, but out of line with the axis thereof. The cover B' is shown connected to the shank or handle B and covering the chamber or tunnel of the hollow blade A'. The piston D is shown driven backward in the position it will occupy when the chamber or tunnel is filled with salt. The shanks or handles A B are shown with the blades fastened together by the pivot C; but instead of the construction shown, the blade forming the cover B' may form the chamber or tunnel, and the blade forming the chamber or tunnel A' may form the cover, it being immaterial which construction is used.

I do not claim, broadly, a two-bladed instrument constructed like a pair of shears and with hollow blades; but, Having described above my invention, what I do claim as new, and desire to secure by Letters Patent of the United States, is—

1. In a salt-injecting instrument, the combination of the piston D and piston-rod D' with the hollow blade A', cover B', shanks or handles A B, and guide $d$, substantially as and for the purpose set forth.

2. In a salt-injecting instrument, the combination of the piston D, piston-rod D', and finger-button $d'$ with the hollow blade A', cover B', shanks or handles A B, and guide $d$, substantially as and for the purpose set forth.

3. In a salt-injecting instrument, the combination of the piston D, piston-rod D', finger-button $d'$, and guide $d$ with the hollow blade A', having a chisel-edge, cover B', and shanks or handles A B, substantially as shown and described.

4. The combination, with a scissors-shaped instrument having hollow blades forming a chamber or tunnel whose walls are of a form or shape along which a piston may play, of the piston D and piston-rod D', with means for securing said piston-rod to one of the shanks or handles A B, substantially as described.

JAMES JACKSON.

Witnesses:
FREDK. ANDREWS,
EDWARD H. CARPENTER.